*Birdsill Holly's Water Filter*

PATENTED APR 11 1871

113516

Witnesses
T. T. Campbell
J. T. Campbell

Inventor
Mason, Fenwick & Lawrence
for Birdsill Holly

UNITED STATES PATENT OFFICE.

BIRDSILL HOLLY, OF LOCKPORT, NEW YORK.

IMPROVEMENT IN FILTERS.

Specification forming part of Letters Patent No. 113,516, dated April 11, 1871.

*To all whom it may concern:*

Be it known that I, BIRDSILL HOLLY, of Lockport, in the county of Niagara and State of New York, have invented a new and Improved Water Filter; and I do hereby declare that the following is a full, clear, and exact description thereof, reference being had to the accompanying drawing making part of this specification, in which—

Figure 1:
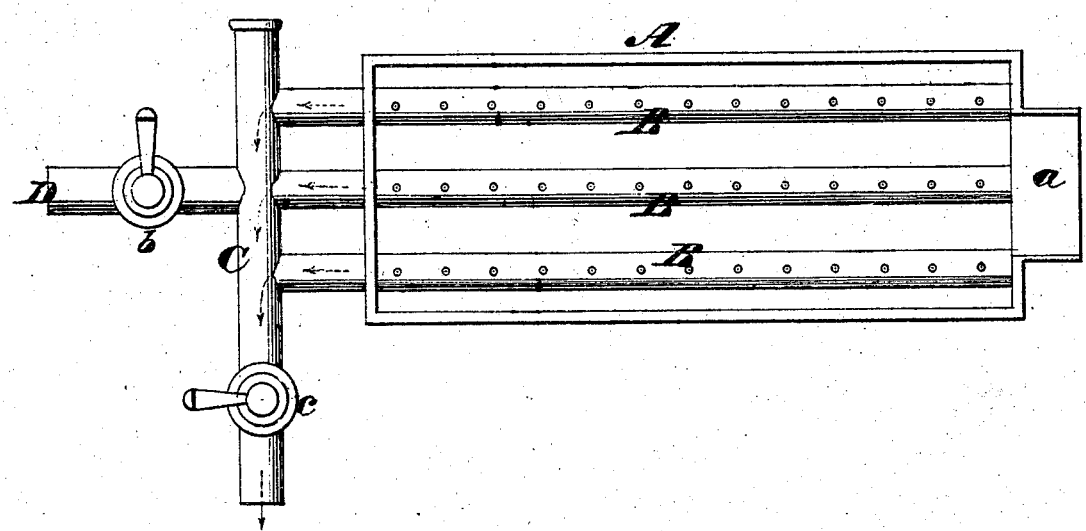
Figure 2:
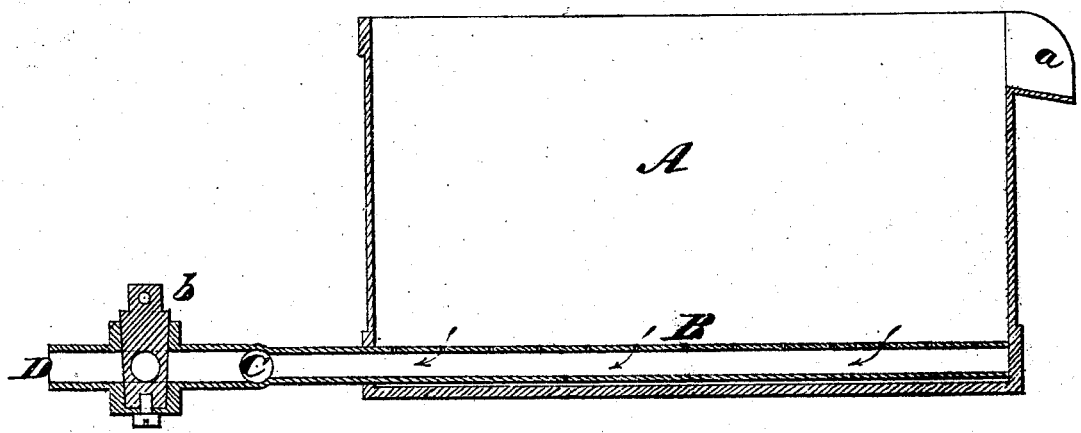

Figure 1 is a top view of the filter. Fig. 2 is a section taken longitudinally and vertically through the center of the filter.

Similar letters of reference indicate corresponding parts in the several figures.

This invention is designed for filtering water which is supplied to cities. It consists in the arrangement of a number of perforated pipes at the bottom of a filtering-vessel containing any suitable filtering material, and in connecting with said pipes, outside of the filtering-vessel, a discharge-pipe having a valve applied to it, and also an inlet-pipe having a valve applied to it, by means of which latter pipe and the valve in the discharge-pipe a stream of water under pressure can be forced into the filtering-vessel and up through the filtering material when it is desired to cleanse the latter of mud and other impurities, as will be hereinafter explained.

The following description of my invention will enable others skilled in the art to understand it.

In the accompanying drawing, A represents a vessel, which may be made of any suitable capacity, and which is provided at one end or near its top with an overflow-spout, a. This overflow-spout affords an escape for water during the operation of cleaning out the filter. At the bottom of the vessel A a number of pipes, B, is arranged horizontally, and is carried outside of the vessel A and connected to a transverse pipe, C. Those portions of pipes B which are within the vessel A are perforated for allowing the escape of water, which is filtered by passing through sand or other suitable filtering material or materials in the vessel A. The discharge-pipe C is provided with a cock, c, and at a suitable point a pipe, D, which is also provided with a cock, b, is connected to pipe C, as shown in both figures of the drawing. During the operation of filtering the cock b is shut and cock c is open, and water passes down through the filtering material in the vessel A into pipes B, and out through the pipe C into the mains. When the filtering material becomes clogged with mud and other foreign substances these are washed away by shutting the cock c, opening the cock b, and forcing water through pipes D B into the vessel A, and up through the filtering material. The muddy water will flow off through the spout a.

I intend to employ this filter in connection with my improved system of supplying cities with water; but it is obvious that it may be used for filtering water which flows from reservoirs.

I know that in the construction of water-filters it has been proposed to so arrange them as to bring a reverse current of water to remove the mud or other substances that would otherwise soon obstruct the flow of water through such filter; but in those cases the filtering materials have been confined between two perforated diaphragms.

I have found by repeated experiment that the interposition of the upper diaphragm prevents the cleansing process from being effectual; but that when the filtering material is placed in a single chamber, so as to be unconfined above, the inverted current thoroughly permeates all portions of these materials so as to wholly cleanse them from all the impurities which they may have collected, and that these, through the free overflow at the top, will soon be removed from the vessel, so that the process of filtration may soon recommence as freely and as perfectly as in the first instance.

Having described my invention, what I claim as new, and desire to secure by Letters Patent, is—

In a water-filtering vessel, A, the perforated pipes B B B, discharge-pipe C, inlet-pipe D, and cocks c b, when said vessel is constructed without any diaphragm or its equivalent, so placed as to prevent the filtering materials from being freely and thoroughly cleansed, the whole constructed and arranged substantially as and for the purpose above described.

Witness my hand in matter of my application for a patent for improved water-filter this 15th day of February, A. D. 1871.

BIRDSILL HOLLY.

Witnesses:
R. T. CAMPBELL,
J. N. CAMPBELL.